United States Patent [19]

Smolentzov et al.

[11] Patent Number: 5,802,159
[45] Date of Patent: Sep. 1, 1998

[54] METHOD AND APPARATUS FOR PROVIDING A CUSTOMIZED TELECOMMUNICATION SERVICE

[75] Inventors: André Smolentzov, Jäfälla; Rolf Staffan Eugen Karlberg, Älvsjö, both of Sweden

[73] Assignee: Telefonaktiebolaget LM Ericsson, Stockholm, Sweden

[21] Appl. No.: 457,471

[22] Filed: Jun. 1, 1995

[30] Foreign Application Priority Data

Jun. 13, 1994 [SE] Sweden .................................. 9402050

[51] Int. Cl.$^6$ ...................................................... H04M 3/42
[52] U.S. Cl. .......................... 379/201; 379/207; 379/219; 379/242
[58] Field of Search ........................ 379/201, 142, 379/211, 215, 216, 93, 207, 219, 220, 221, 242

[56] References Cited

U.S. PATENT DOCUMENTS

| | | | |
|---|---|---|---|
| 4,747,127 | 5/1988 | Hansen et al. | 379/94 |
| 5,075,847 | 12/1991 | Fromme | 395/705 |
| 5,323,452 | 6/1994 | Dickman et al. | 379/201 |
| 5,337,351 | 8/1994 | Manabe et al. | 379/201 |
| 5,345,380 | 9/1994 | Babson, III et al. | 379/201 |
| 5,553,127 | 9/1996 | Norell | 379/201 |
| 5,627,888 | 5/1997 | Croughan-Peeren | 379/201 |

FOREIGN PATENT DOCUMENTS

| | | |
|---|---|---|
| 92/11603 | 7/1992 | WIPO. |
| 92/11724 | 7/1992 | WIPO. |

OTHER PUBLICATIONS

"Microsoft MS-DOS 5.0 User's Guide and Reference", Packard Bell, pp. 7–9 and 17–41, 1991.

Primary Examiner—Daniel S. Hunter
Assistant Examiner—Scott Wolinsky
Attorney, Agent, or Firm—Burns, Doane, Swecker & Mathis, L.L.P.

[57] ABSTRACT

A customized telecommunication service comprising a service related component, referred to as a service shell, and a number of customization parts open to customization by a service provider. The service shell is designed by a system vendor with due consideration taken to the fact that the service must not interfere in a non-desired way with other existing services. The service shell comprises customization points to which the customization parts are added. Each customization point comprises an individual customization interface defining the scope of actions open to customization in the service shell. The service provider selects, among the actions, those which will build the desired function of the customization part.

34 Claims, 9 Drawing Sheets

24  CU-INTERFACE_NAME

METHOD AND APPARATUS FOR PROVIDING A CUSTOMIZED TELECOMMUNICATION SERVICE

BACKGROUND OF THE INVENTION

The present invention relates generally to services in a telecommunication system, and more specifically to the provision of customized telephone services.

A modern telecommunication system provides a number of subscriber services, automatically invoked in specific situations. Typical examples are different types of rerouting services. Different subscribers have different needs which implies variants of the service. Thus, there may be conditional rerouting service like "Call forward on busy", "Call forward on no answer" as well as unconditional rerouting used to reroute incoming calls to a set of answer locations. Those services in their turn may exist in variants, where the calling subscriber is forwarded to different numbers based on his country code or directory number, date or time of day, or on a code entered by the called subscriber etc. The result is a greater variety of similar but different services.

The service provider wants to offer services that are tailored after the needs and wishes of his customers, the subscribers. He also wants to provide new and modified services with short delivery times. This is most easily obtained when the services are customized as close as possible to the end customer.

PRIOR ART

WO 92/11724 describes how a new service can be implemented on a network wide basis without modifying the telephone network switching system software. Service primitives are assembled into telephone services using the graphic capabilities of a computer work station. A complete telephone service is represented by a graph consisting of nodes and edges, the nodes representing service primitives executable by service implementing components and the edges representing the order of execution of said primitives. With this representation the new telephone service is displayed as a "tree" of nodes. The tree display can be manipulated graphically to create and alter the logic of the service.

A node library comprises all previously specified nodes (primitives). A service creator selects from said library a subset of nodes (primitives) that are interconnected to form a complete service logic. The service logic thus created can by used as a service template. The service creator will use the service template to individualize the service to a particular user by entering individual subscriber dependent data.

There is no requirement that a customer created service must not interact or interfere with other existing services. The lack of such requirement may imply that a customer created service interacts in a non desired manner with other services causing unpredictable behavior of the telephone system.

WO 92/11603 describes a method and apparatus for creating customized call processing information (CCPI) records providing customized telephone services for individual subscribers to a network. A graphical method is used to design the customized service. A customized services application is used to create each customer's service or service program. Each customer's service or service program is stored as a record or as a series of records in a data base. Each such record comprises customized call processing information (CCPI). The customized services application includes a programming interface which permits an operator to use the customized services application to create various user interfaces to obtain information in a manner which is relatively easy to use. The customer or operator inserts only a small amount of information thus avoiding the need of a computer programming to write program sequences to define the service or to make changes to the program sequences to modify the service.

The known graphical methods are used in order to create a complete service. It is difficult for the service software designer to foresee all the customization needs that a future service provider may have, i.e., which type of parameters are needed for customization of the service. When new parameters are needed the service software has to be redesigned since the parameters are tightly coupled to the software. The redesign has to be ordered from the service software vendor thus delaying the interval between service redesign and service offering.

The ranges of the available parameters are limited to values defined in the service software. For example a rerouting service may include a set of 10 answer locations as parameters. Introduction of an 11th answer location implies a redesign of the service software.

It is difficult for the service software designer to describe how to modify a service that has a number of parameters with complex interdependencies. Consequently, it is also difficult to foresee the result of a new combination of parameter values for the services provider when modifying a service.

A service is implemented as a software module. For each customized variant of the service there is also a variant of the software module. To facilitate the introduction of only slightly different variants of a service, the software modules include data or parameters that control the behavior of the service. A few examples of such parameters are a set of answer locations, a set of times per day when answer locations are to be switched, a set of originating area codes to be used when deciding the answer location for the call. The parameters may be available for change by the service provider. In this way the service provider gets a means to adapt services to individual wishes to a certain extent.

U.S. Pat. No. 4,747,127 relates to a customer programmable real-time system allowing the customer to design a new service and to modify existing ones from his customer unit. The customer unit comprises a computer, a telephone set and a terminal.

The logic that implements the customer created service will execute in the customer's computer. Further, the customer created service is confined to the customer unit and cannot be used by other parties.

There is no requirement that a customer created service must not interact or interfere with other existing services. The lack of such requirement may imply that a customer created service interacts in a non desired manner with other services causing unpredictable behavior of the telephone system.

In this U.S. Pat. No. 4,747,127 the customer needs to be aware of the state diagram of a call in which the new service is invoked and of the system signals by which the new service is invoked. This is a drawback since such state diagrams tend to be highly complicated requiring a high degree of expertise knowledge of the customer. Further, the customer must have thorough knowledge of the system signal also requiring a high degree of expertise knowledge of the customer. Should the customer not have the required knowledge there is a great risk that the services he designs causes malfunction of his customer unit and of the complete telecommunications system.

DISCLOSURE OF THE INVENTION

It is therefore an object to provide a service that comprises a service related part, referred to as a service shell, and a number of service customization parts open to customization by a service provider. The service shell is designed by a system vendor, an organization that has all the knowledge and competence required to design a service so it does not interfere with the proper operation of the telecommunication system within which the service is used. Preferably the system vendor designs the service shell so it will not give rise to unwanted service interaction. In particular the service shell comprises customization points to which the customization parts are added. In accordance with the invention the system vendor provides each customization point with an individual customization interface defining the scope of actions open to customization in the service shell. The scope of actions open to customization is so defined by the system vendor that irrespective of how the individual actions are combined, the resulting customization part cannot interfere with the proper operation of the telecommunication system wherein the service is used. The service provider selects, among said actions, those which will build the desired function of the customization part.

In accordance with the present invention a complete customized service is divided into two parts, a semi-manufactured basic part and a customer logic part. The semi-manufactured basic part is a services related component which in the following will be referred to as a service shell. The customer logic part comprises customer logic that is tailored to the individual need of the customer and that comprises a subset of a predetermined set of service independent functions referred to as primitives in the following.

An important aspect of the present invention is that the service shell comprises basic service logic and one or more customization interfaces which are used to define the customer logic part. The customization interfaces are well defined by the system vendor or the organization providing the service shell so as not to cause non-desired interdependencies, also referred to as interaction or interference, between different services which are active at the same time. The customization interfaces are in this sense "narrow" since the parameters open to customization are selected by the system vendor programmers—which have an overall view of the telecom services and their behaviors—for presentation to the service provider. Once selected by the service provider they cannot be altered by the customers. The system vendor, however, may later on add new or remove old customization points. A customization point resides in the service shell. From a customization point the customization logic is called for execution. The customization interfaces differ from customization point to customization point as a general rule. In the preferred embodiment of the invention the customization interfaces are presented to the service provider by a graphic editor used by the service provider as a tool for generating the code of the customer logic.

Accordingly, the customization capabilities are entirely controlled by the customization interfaces.

DESCRIPTION OF PREFERRED EMBODIMENTS

Figure 1:
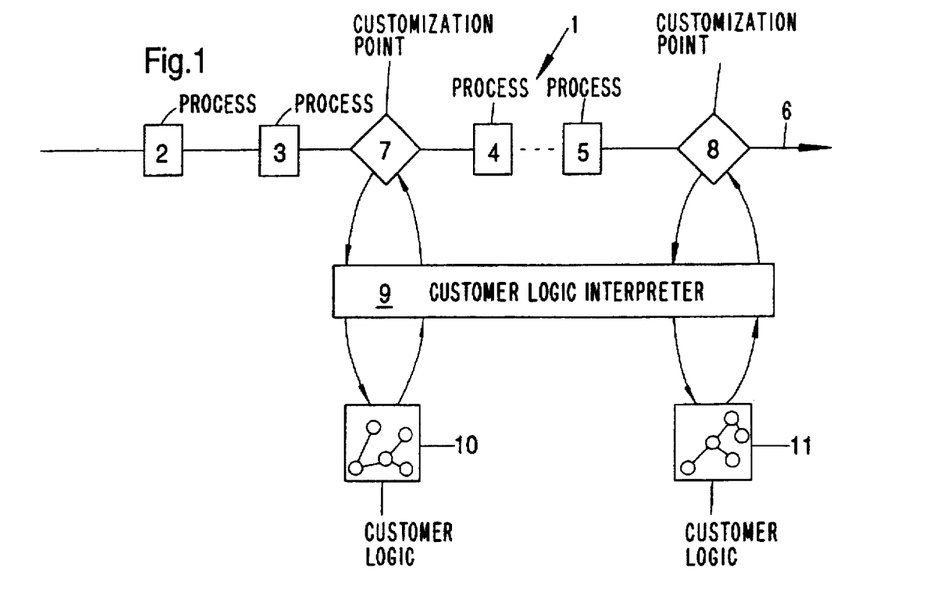
FIG. 1 is partly a block diagram partly a flow diagram showing the execution of a customized service in accordance with the present invention.

In FIG. 1 there is shown a service shell 1 comprising a number of processes 1, 3, 4, 5 that are running one after the other in the order indicated by a time axis 6. Processes may also be running concurrently but for the sake of clarity this has not been illustrated. The service shell 1 comprises customization points 7, 8 that are encountered during execution of the service shell. Customization points provide customization capabilities of the service shell and are specifically designed to support customization. In the example shown the service shell comprises two customization points but service shells having more or even less are within the scope of the present invention. A service shell must at least have one customization point. Each customization point comprises two types of interfaces: (1) Customization interface and (2) runtime interface. These interfaces are completely defined when the service shell is defined. When the service shell is executed and a customization point is reached the customization point calls a customer logic interpreter 9 that controls the execution of customer logic 10 specifically designed, by the customer, for customization point 7. After execution of the customer logic 10 a result parameter value is achieved, this result value being returned, by the customer logic interpreter 9, to the service shell together with execution control. Execution proceeds of the service shell and when customization point 8 is reached the same procedure is repeated at the customer logic interpreter 9, but now with a different customer logic 11. Customer logic 11 is generally different from customer logic 10 but may also be the same.

A customization point presents a functional and user friendly customization view of the service shell and defines in detail parameters and variables in the service shell 1 that are available for customer logic. Available parameters and variables are specified with their types and allowed operations such as read, write as will be explained below.

Figure 2:
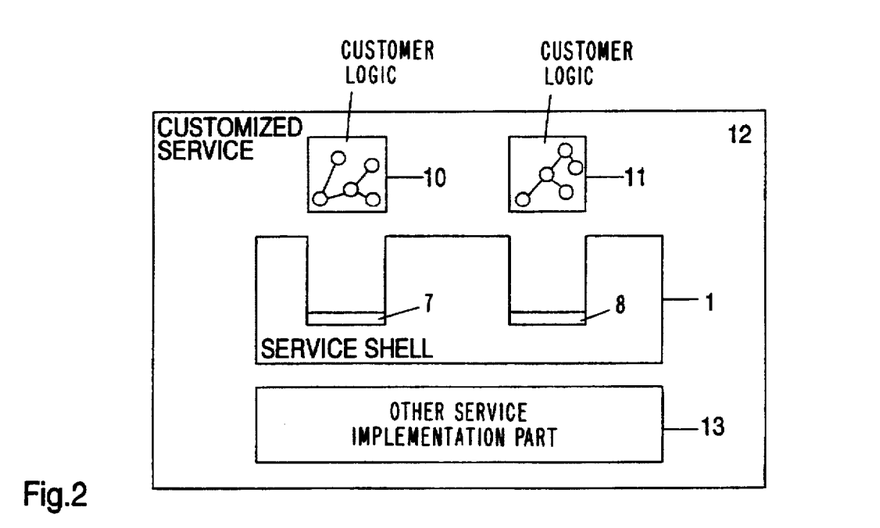
FIG. 2 is a diagram showing the customized service of FIG. 1.

In FIG. 2 a customized service 12 is shown to comprise the service shell 1, the customer logic 10, 11 as well as other service implementation parts 13.

The service shell 1 is a semi-manufactured service to which customer logic is added. Variants of the service are created by adding and combining different customer logic to one and the same service shell. A customer A may for example have customer logic 10 at customization point 7 while another customer B may have a different customer logic at customization point 7. Customer A will accordingly have one customized service 12 while customer B will have a different customized service.

Figure 3:
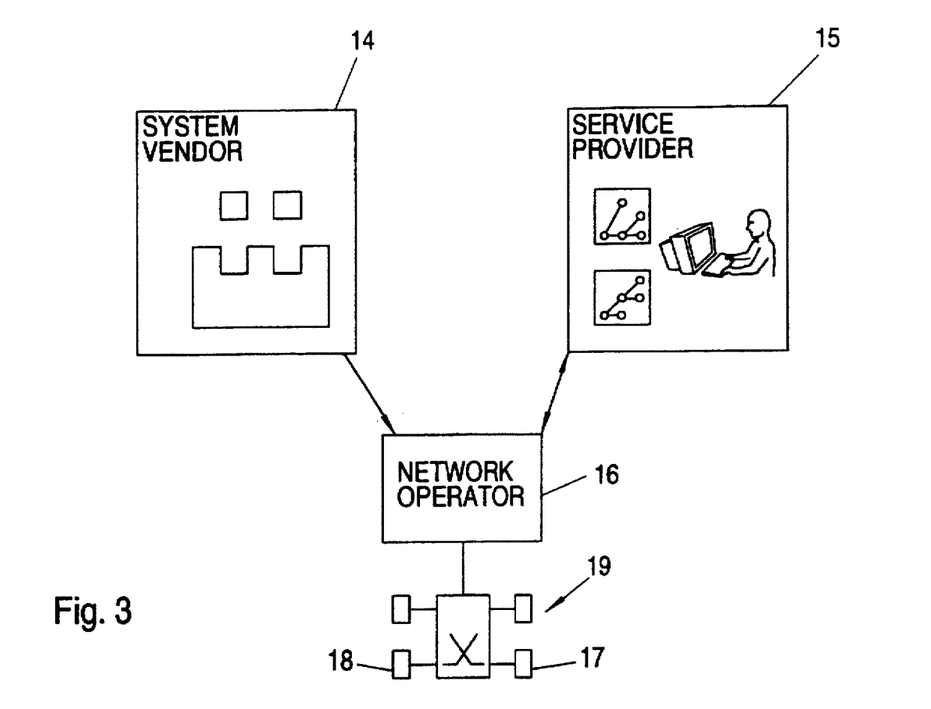
FIG. 3 is a diagram showing the service customization environment and the actors involved in service customization.

FIG. 3 is showing the actors involved in the service customization process to be described below. There is a system vendor 14, a service provider 15, a network operator 16 and a service subscribers 17, 18. The system vendor 14 is the organization that develops the two components of the service customization concept in accordance with the invention, i.e. the service shells and the primitives referred to in the introductory portion of the specification. The system vendor 14 also develops the network infrastructure to execute these components and the environment for service customization, i.e. a graphical editor in the preferred embodiment of the invention. The network operator 16 is the organization responsible for operating the network, for example a GSM network operator. The network operator 16 has the ultimate responsibility that the telecom network, represented by reference numeral 19 in FIG. 3, operates correctly. The network operator 16 must be sure that none of the customized services causes malfunction in the network. The service provider 15 is the organization that is responsible for the providing services to the service subscribers 17, 18. One important role for the service provider is to customize services to the subscribers. That is, the service provider 15 must have a service customization environment, such as a tool for generating customer logic, requisite service shells and primitives. However, the service provider 15 may have limited knowledge of the telecom network 19. The service provider 15 may also be the network operator 16 or may be a third party. A possible scenario is to have several independent service providers that provide customized services running in one the same network. Each of the service subscribers 17, 18 is an entity that subscribes to the customized service. A service subscriber may be a company or an individual end user. A service subscriber may need to fine tune the customization to adjust the service to his own particular needs. He does so by instructing the service provider to compose customer logic that fulfill his needs. Provided that the service is designed for customer fine tuning the subscriber can fine tune the customer logic.

Figure 4:
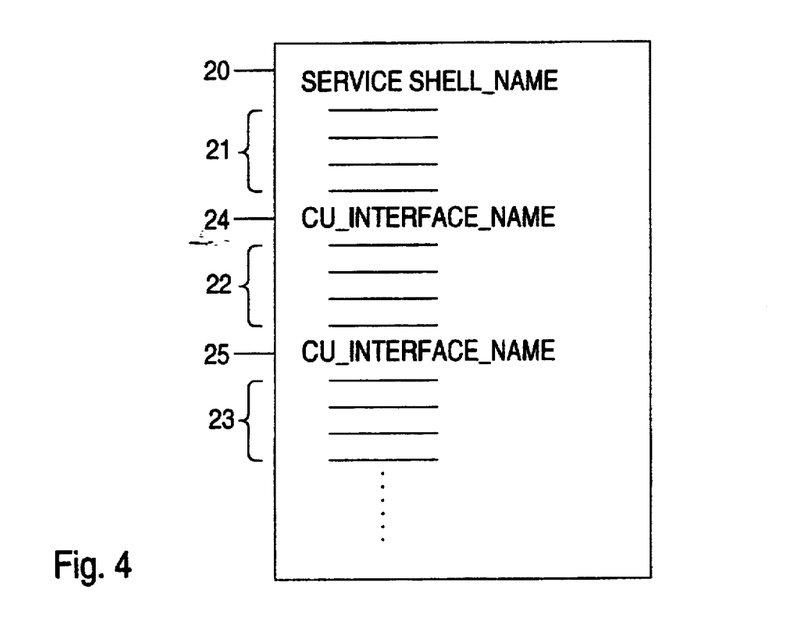
FIG. 4 is a diagram illustrating the service shell in FIG. 1.

In FIG. 4 the general design of a service shell is shown. By way of example a service shell may relate to black-list-service, call-back-service, conference-service, diversion-service, hot-number-service, free-on-second-line-service, intrusion-service, parking-service, pick-up-service and many other examples. The service shell comprises basic logic, 21, 22, 23 for the service and the requisite customization points 24, 25. A service shell provides a robust platform for customization and does also take care of any undesirable interaction with other services in the network. The service provider creates a complete service by adding the necessary customer logic to the customization points of the service shell. The service shell is developed by a system vendor using his regular development process and development tools. The service shell is delivered to the network operator and is loaded into the network. Each customization point is referenced, for example by a name such as CU-INTERFACE__NAME. Other references than names may be used but it is preferred to use a name that describes the action to be taken at the customization point. In FIG. 2 two customization points are shown but of course more than two can be present. The service shall must have at least one customization point. In FIG. 4 the service shell 20 comprises three blocks 21, 22, 23 of basic logic but this number is of course different for different services. It is the customization points that are specifically designed to support customization of the service.

Figure 5:
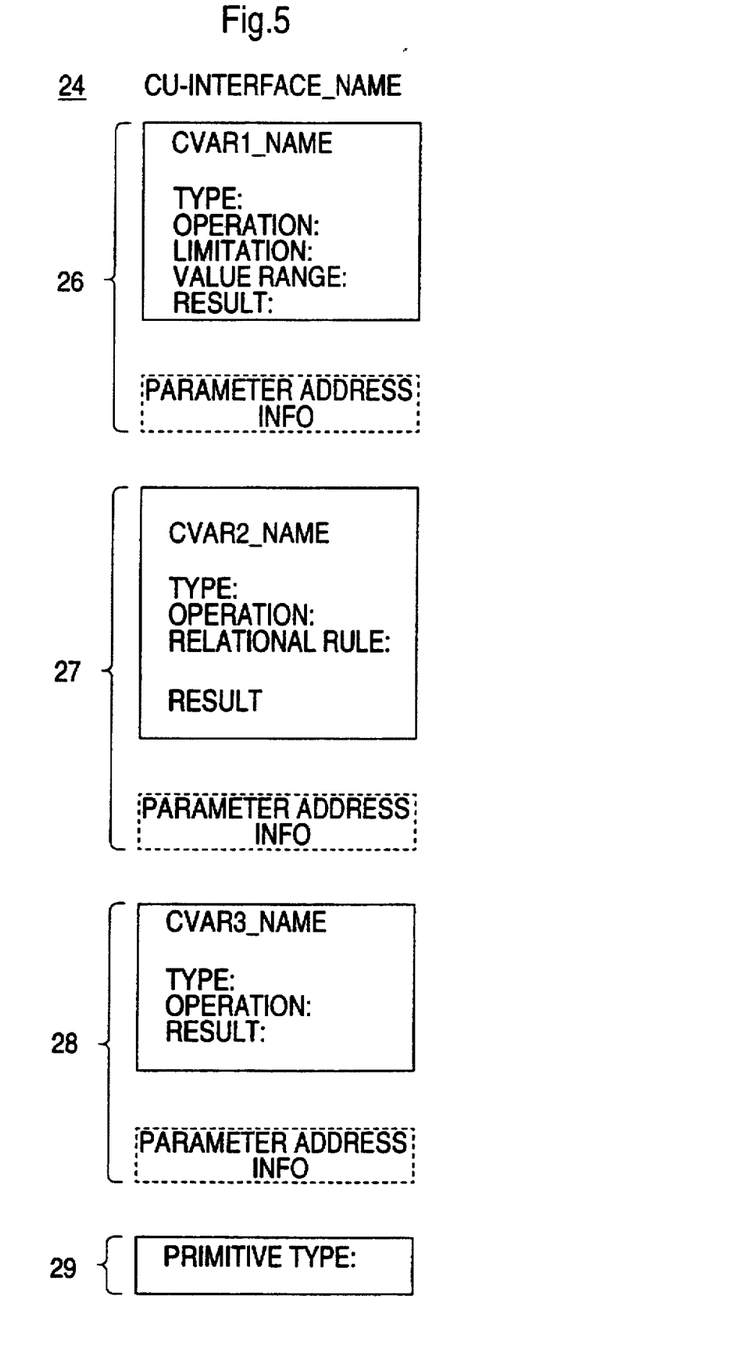
FIG. 5 is a diagram showing a functional view of a generic customization interface.

In FIG. 5 the general structure of a customization point is shown, for example customization point 24 of FIG. 4. A customization point has two types of interfaces: (1) Customization interface and (2) runtime interface. These interfaces are defined when the service shell is designed. In FIG. 5 the customization point is shown from a functional view and in this view only the customization interface is shown. The customization interface provides the basis for the creation of customer logic. Each customization interface comprises an number of parameters 26, 27, 28. Each parameter is referenced by a name CVAR1__NAME, CVAR2__NAME ... CVARn__NAME. The parameters of a customization interface are of two types, input parameters and result parameters. The input parameters are input to the customer logic. The input parameters are made visible to customization and can not be changed during customization. The result parameters are the parameters that must be defined by the customer logic.

The following information must be defined for each customization interface parameter:

| | |
|---|---|
| Name | Each input-result parameter has a name |
| Data type | There is a set of common data types and each parameter must have a data type that belongs to the data type set in question. This predefined set of data types provides a common basis that allows different primitives to operate on input/output parameters. 'Integer', 'string', 'subscriber number' are examples of common data types. Any restrictions, such as max value, min value, range, restricted value, to the parameter must also be defined. This information is used by the graphical editor to assure that there is a correct type matching when a primitive accesses a parameter. |
| Parameter category | Some of the parameters in a customization point may only be read but may not be changed, i.e. a read-only parameter. Other parameters may have a valid value that may be changed, i.e. a read/write parameter. Other parameters may not have a valid value and a result value must be provided, i.e. a write-only parameter. |
| Relational rules | Some of the parameters may be optimal, others are mandatory. There may be relationships between parameters that must be clearly defined. As an example a parameter CVAR1 must be greater than a parameter CVAR2. |
| Descriptions | To each parameter belongs a description describing the parameter so as to support and facilitate the creation of customer logic. |

All of the above information is visible to the service provider at the graphical editor to be described below. The visible information is indicated by solid line blocks. The customization interface also comprises invisible information indicated by dashed line blocks. In particular the address of each parameter in the individual customization interface is hidden to the person designing the customer logic. Said addresses refer to positions in the call record (the record that comprises A-number, B-number, category etc.) of the individual call. The hidden addressing information as will be described later on and is used when the graphical editor generates the data that is loaded into the telecom network 19.

The system vendor wants to keep control over the use of different primitives for different customization points. In doing so the system vendor protects the telecom system reliability. It shall not be possible for a customer logic designer to use primitives that may interfere with the proper operation of the telecom system. To this end each customization interface also comprises a visible primitive type indicator 29 that describes the type of primitives the system vendor allows for the customization point. A primitive is a basic operation that is used to build the customer logic. The use of primitive type indicators also makes it possible for the system vendor to add, later on, new primitives without redefining the customization.

Figure 6:
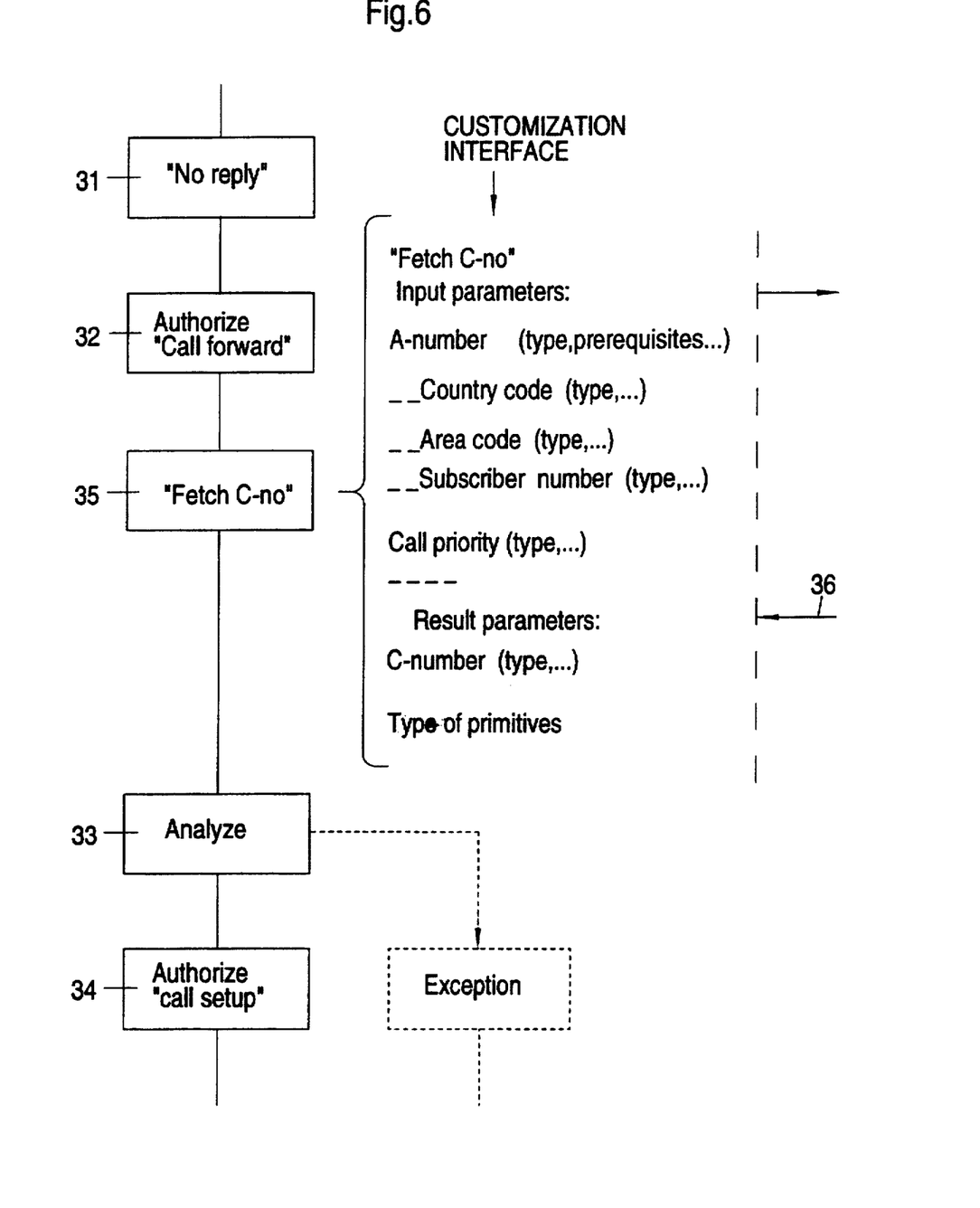
FIG. 6 is a diagram similar to FIG. 4 showing an example of a customization interface description.

In FIG. 6 there is shown a service shell similar to that shown in FIG. 1 comprising a number of processes 31–34 and a customization point 35. The service shell relates to the service "Call forwarding at no reply". The service shell comprises the conventional call forwarding processes "no reply", process 31, "authorize call forward" process 32, "analyze", process 33 and "authorize call set up", process 34. The service shell also comprises the customization point 35 "fetch C-number". This process 35 must define the actual directory number for the answering position, i.e. the C-number. The corresponding customization interface "fetch C-number" defines the information which is visible for customization, i.e. the input parameters A-number, country code, area code and subscriber number. There is also a parameter called "call priority". The result parameter, C-number, will be returned from the customer logic interpreter 9 to the service shell as is indicated by the arrow 36. Each of the input and result parameters are defined by their name data type and other variables. The customization interface "fetch C-number" comprises input and result parameters. The customization interface merely describes the input and result parameters. The customization interface plays no role during execution.

Figure 7:
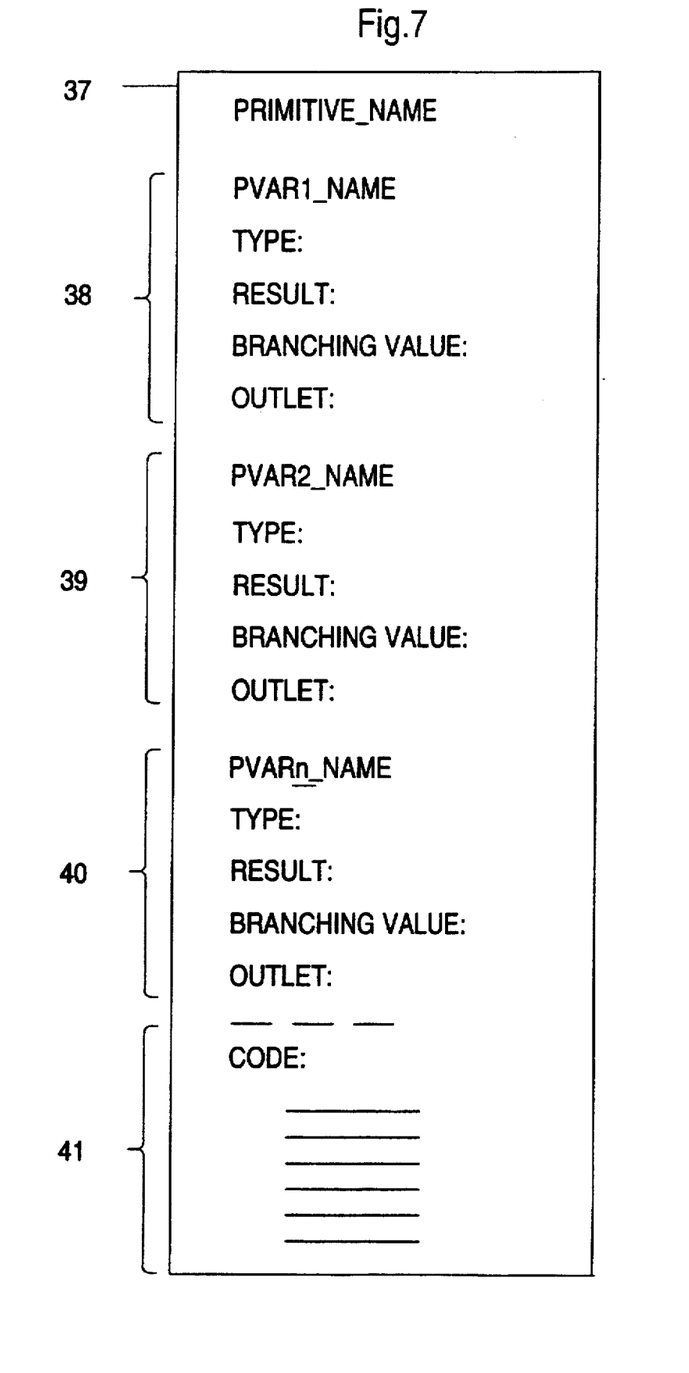
FIG. 7 is a diagram showing the structure of a primitive representative for the primitives used in the set of primitives defining the customization interfaces in accordance with the invention.

Primitives are generic components that are used to customize many different service shells. One and the same primitive can therefore be used by many service shells. Primitives as well as service shells reside in the telecom network. In FIG. 7 the general layout of a primitive 37 is shown. Each primitive has a name and comprises a set of input data, a set of result data, branching values and one or more outlets to be used for branching. The outlets are links which are used to connect one primitive to another in the customer logic. As appears from FIG. 7 each primitive comprises a number of parameters 38, 39, 40, each such parameter being referred to as a parameter variable having a name PVAR1__name, PVAR2__name ... PVARn__name (P referring to primitive). Each such parameter variable indicates whether the parameter represents input data or result data. Further to the parameters a primitive comprises code, represented by block 41, said code comprising the functions and operations performed by the primitive. The parameters represent variables used by the functions in the code block. The type of each parameter must be stated, i.e. whether it refers to an integer, a string or whatever kind of data or data structure the parameter takes.

For each primitive there is defined a primitive interface that comprises a set of input parameters and a set of result parameters as viewed from within the primitive. Each input and result parameter of a primitive comprises the following attributes: identity, data type and input/result category.

Primitives are classified into two classes depending on the type of resources that they can operate on, namely 1) a self contained resource or 2) shared resources. Primitives of the type that operate on self-contained resources are so designed that they can only modify their own resources and result parameters. Primitives of the self contained type may be used in the customer logic connected to any customization point without any risk of undesirable interaction. Primitives of the type shared resources are so designed that they are allowed to operate on and modify the status of resources that are shared by many services, such as for example a switching center. A primitive of the shared resources type can only be used at a customization point that is specifically designed for it. In other words the customization interfaces of a customization point in which a primitive of the common resources type is used may restrict the use of primitives that manipulate shared resources.

Figure 8:
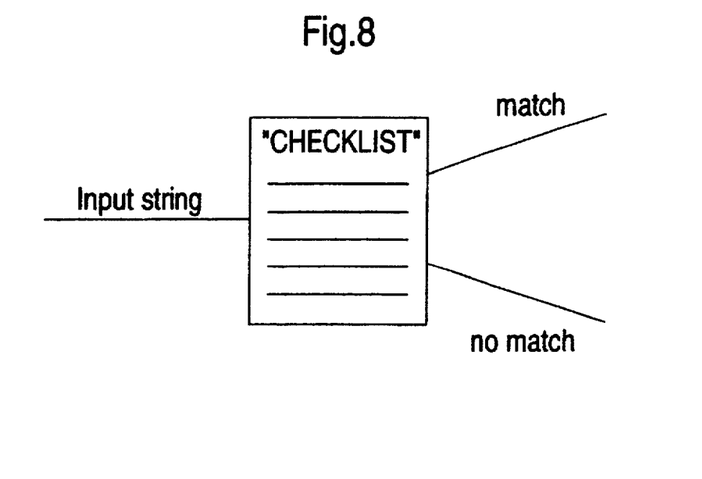
FIG. 8 is a diagram showing a primitive called "checklist".

In FIG. 8 an example of a primitive called "check list" is shown. The input parameter is of the "string" type and the primitive comprises in its code part 41 a list of strings. The function of the primitive is to compare the input string with the list of strings. If there is a match a branching value "match" is selected. If there is no match between the input string and the strings in the list the branching value "no match" is selected. The same primitive "check list" may be used in a customer logic comprising B-numbers and in other customer logic with "names", provided both are defined as strings. I.e. one and the same primitive may have many functional roles provided the predefined data types of the parameters are consistent with each other.

Figure 9:
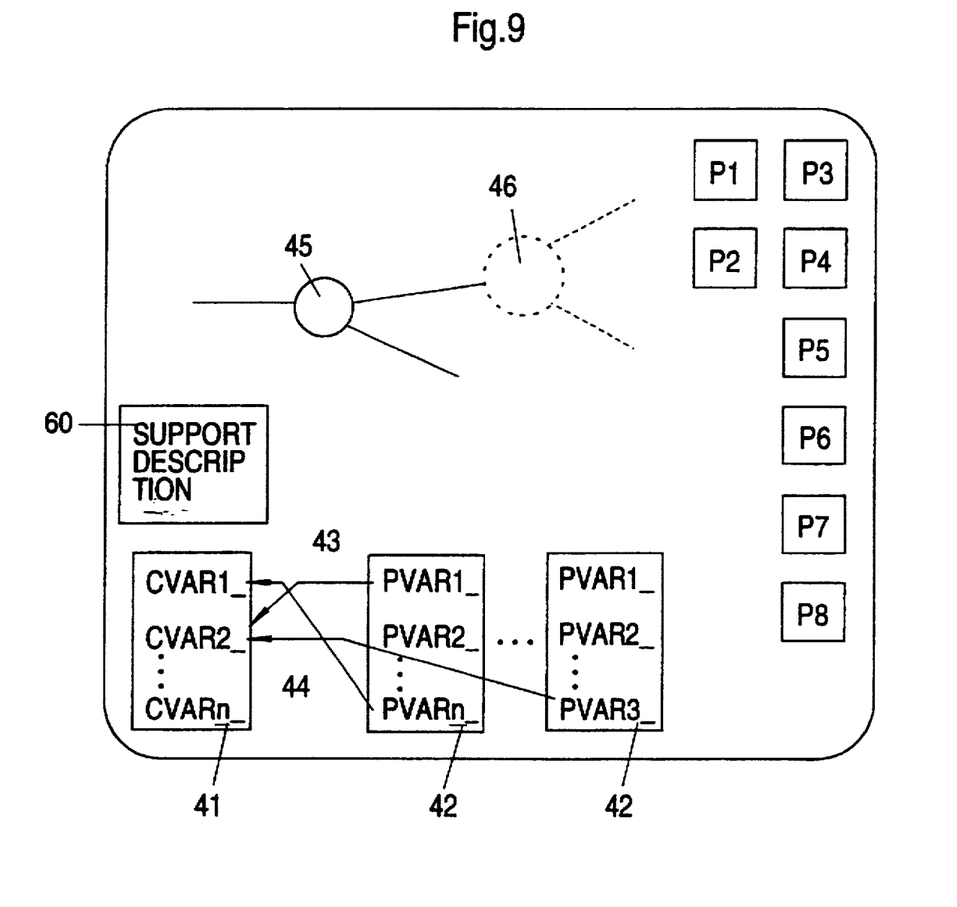
FIG. 9 is plane view of a screen as shown on a monitor that forms part of a graphic editor used by a customer for designing the customer logic, in accordance with the invention.

FIG. 9 is a view of the screen of a graphical user interface forming part of a customer logic generating tool. This tool generates data that represents the customer logic. To the right of the screen there is shown a number of icons P1–P8, each icon representing an individual primitive. The service provider wishing to create customer logic starts by sketching the desired customer logic with regard to the possibilities offered by the existing primitives P1–P8. The procedure to create the customer logic is rather straight forward. At first the desired service shell is selected and its customization points are retrieved. This selection takes place by clicking on an icon, not shown, representing the customization interface. A window 41 will pop up showing the parameters CVAR1__, CVAR2__ ... CVAR3__ that are available for customization. Next the primitive that fulfills the desired function is selected from the palette of icons P1–P8. The operator selects the icon in question by clicking on it with a pointer device such as a mouse, a pencil or the like. When an icon has been selected a second window 42 pops up, said second window showing the parameters of the primitives. These parameters PVAR1, PVAR2 ... PVARn are shown within the window 42 on the screen. Next the operator binds one of said parameters to a parameter available in the customization interface. Such binding takes place by using conventional point-and-drag-procedure, i.e. by pointing at a parameter (for example PVAR1__) with the pointing device and dragging the pointing device to the corresponding CVARn__ parameter (for example CVAR2__) in the pop up window 41. This pointing and dragging has been illustrated by arrow 43. If more parameters of the selected primitive are to be bound to the customization interface a similar point and drag procedure is repeated. In FIG. 9 this is represented by arrow 44. Next the two last steps are repeated for each new primitive selected among the icons P1–P8 and by providing the necessary bindings between the PVAR and CVAR parameters.

The binding of a primitive parameter PVARn__ to customization interface parameter CVARn__ means that the CVARn__-value, entered by the customer logic designer in the pop up window 41, will be taken by the primitive. The primitive will later on, when the customization logic is executed, perform its operation using the entered CVARn__-value.

When the customer logic designer points on the border of any of the windows 41, 42 a third window 60 opens and displays information that describes the performance and meaning of the customization interface and its variables. In other words this provides on-line support information to the customer logic designer.

When a primitive is selected a node represented by a ring 45 will appear on the screen. If the primitive for example was "check list" as shown in FIG. 8 the node 45 shown on the screen will also have the three straight lines that represent an inlet and two outlets. The outlets are named "match" and "no match". Next the two last steps are repeated for each new primitive selected among the icons P1–P8 and by providing the necessary bindings between the PVAR and CVAR parameters. A new node 46, shown in dashed lines, appears on the screen. The customer logic designer links the appropriate outlet of node 45 to the inlet of node 46. In this manner a logical tree is successively built, said logical tree showing the customer logic in a user friendly and easy to conceive way.

Figure 10:
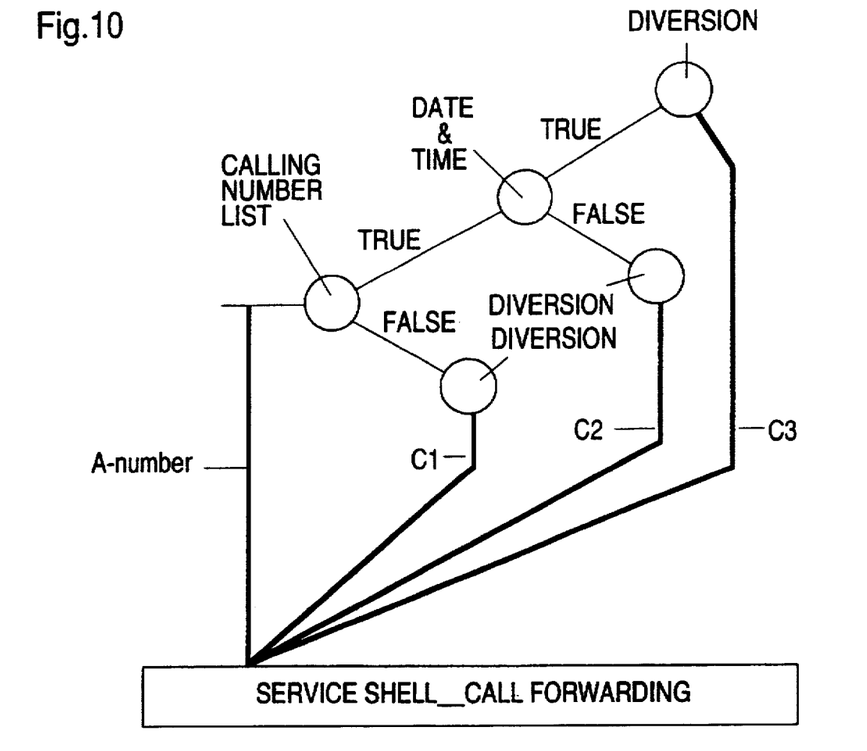
FIG. 10 is a diagram illustrating how primitives, shown on the graphic editor, are bound to a customer interface so as to form nodes that interact with the service shell.

In FIG. 10 the logical tree of one example of a customer logic for the service "call forwarding at no reply" shown in FIG. 6 is indicated. When the service shell reaches a customization point it hands over further execution of the service to the customer logic that starts by testing the calling party's number against the node "calling number list". If the calling party has the service active, result parameter "true" is selected while in the opposite case value C1 of the result parameter C1 is returned to the service shell. Next the customer logic tests the date and time of the call from the calling party and if it is business hours and correct date a diversion to a certain telephone number, represented by value C3 of result parameter C3, is sent to the service shell. If the calls falls outside the date and time tested by the date and time node then the call is diverted to another number, represented by parameter C2, different from that represented by parameter C3. In FIG. 10 the bindings between the customization interface variables CVAR and the variables PVAR of the different primitives are shown in solid black lines labels A-number, B1, C2 and C3.

Figure 11:
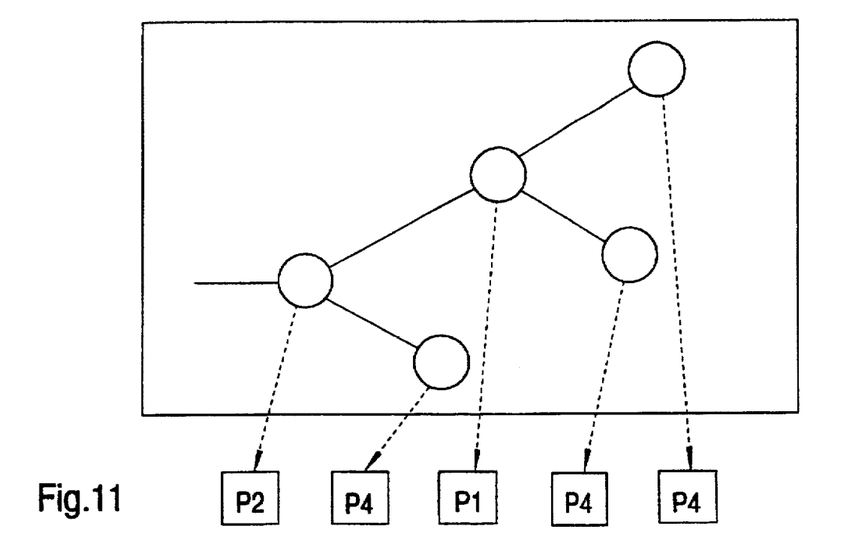
FIG. 11 illustrates each of the nodes of FIG. 9, in particular its respective primitive.

FIG. 11 is a view showing the same logical tree as that in FIG. 10. This Figure has been included to show that behind each of the nodes there is a primitive. Different nodes may use the same primitives.

Figure 12:
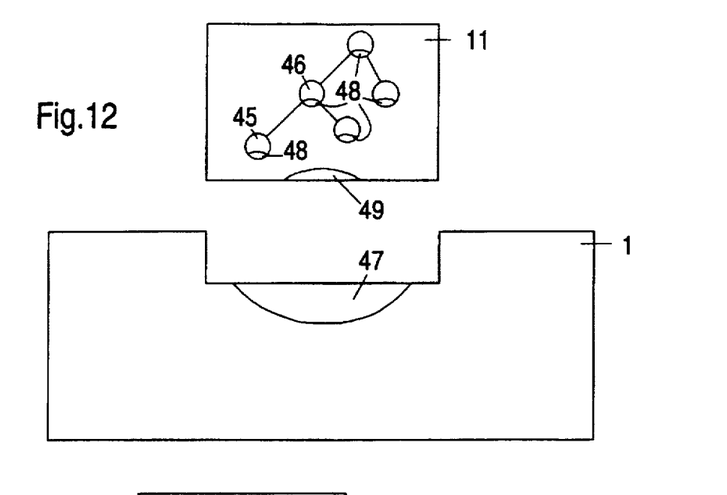
FIG. 12 is a diagram showing the service shell, customer logic and the two kinds of interfaces therebetween.

FIG. 12 illustrates the relation between customization interfaces, customer logic and primitive interfaces. The service shell 1 has a customization interface 47. This interface comprises the parameters discussed in FIG. 6, that is the parameters and their data types, value range, categories and relational rules and allowed primitive types. The customer logic 11 comprises at each node thereof a primitive interface 48 that matches the applicable part of the customization interface 47. This concerns the primitive type and everything that the customization interface 47 states about the parameters (data types etc.) to which the node is connected. Part 49 of customer logic 11 is not an interface but represents the fulfillment of the relational rules that the customization interface 47 states about mandatory result parameters and result parameter interdependencies. This type of rules refer to the customer logic 11 as a whole and not to individual nodes therein.

Figure 13:
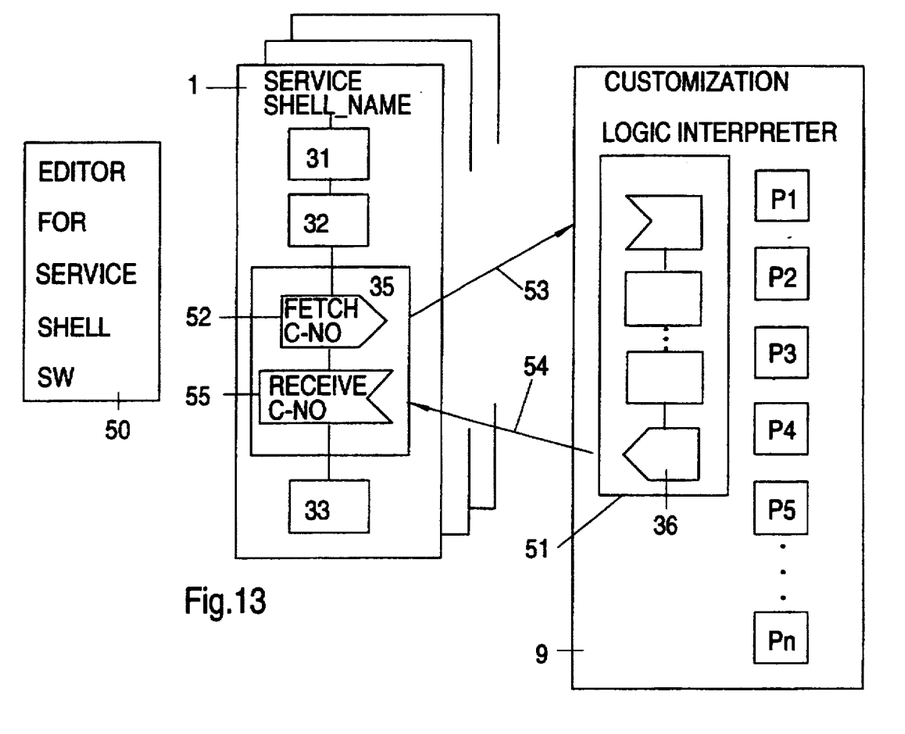
FIG. 13 is partly a block diagram partly a flow diagram showing the execution of a service shell in runtime.

In the previous Figures the service shell and the customer logic have been shown from a functional point of view. In FIG. 13 they are shown in a run time view. The service shell 1 is designed using a tool 50 for editing and generating the code of the service shell. The service shell is then loaded into the network. The service shell may either be executed in local exchanges distributed in the telecommunication network or in centrally located service central points (SCP:s). Upon execution of the service shell it interacts with the customer logic interpreter 9. The interpreter 9 comprises logic 51 that is general to all customer logic 10, 11. After execution of the processes 31, 32 in the service shell 1 the customization point 35 is reached. At the customization point a call is made to the customer logic. This call is represented by symbol 52 "fetch C__no". This call represents a runtime interface to the customer logic. In response to the call customer logic data is passed to the customization logic interpreter 9. The passing of this data is represented by arrow 53. As discussed above the data sent to the interpreter 9 does not contain any code. It comprises customization interface data of the type shown in FIG. 6 which, as described in connection with FIGS. 9–11, contains information sufficient for the customization logic interpreter 9 to reconstruct therefrom the particular customer logic. The customer logic is executed in the interpreter 9 and the result parameter is returned to the same customization point 35 from where the call was made. The result data transmission back to the service shell is represented by arrow 54. The result data is then used by the service shell. Upon reception of the result data the service shell will take over control of the execution and use this result data in the next operation 33. The reception of the result data in the service shell is indicated at symbol 55. Symbol 55 therefore also represents a runtime interface of the service shell. The result data comprises just data and no code. In the customization logic interpreter 9 the code of the primitives P1–Pn is stored. Each primitive is stored on its own memory location and is accessed by a reference to the address in the memory where it is stored. It is these addresses that are passed in the data passing 53 as primitives to execute, i.e. not the code of the primitives are passed but pointers to addresses in the memory location where the primitive are stored.

Figure 14:
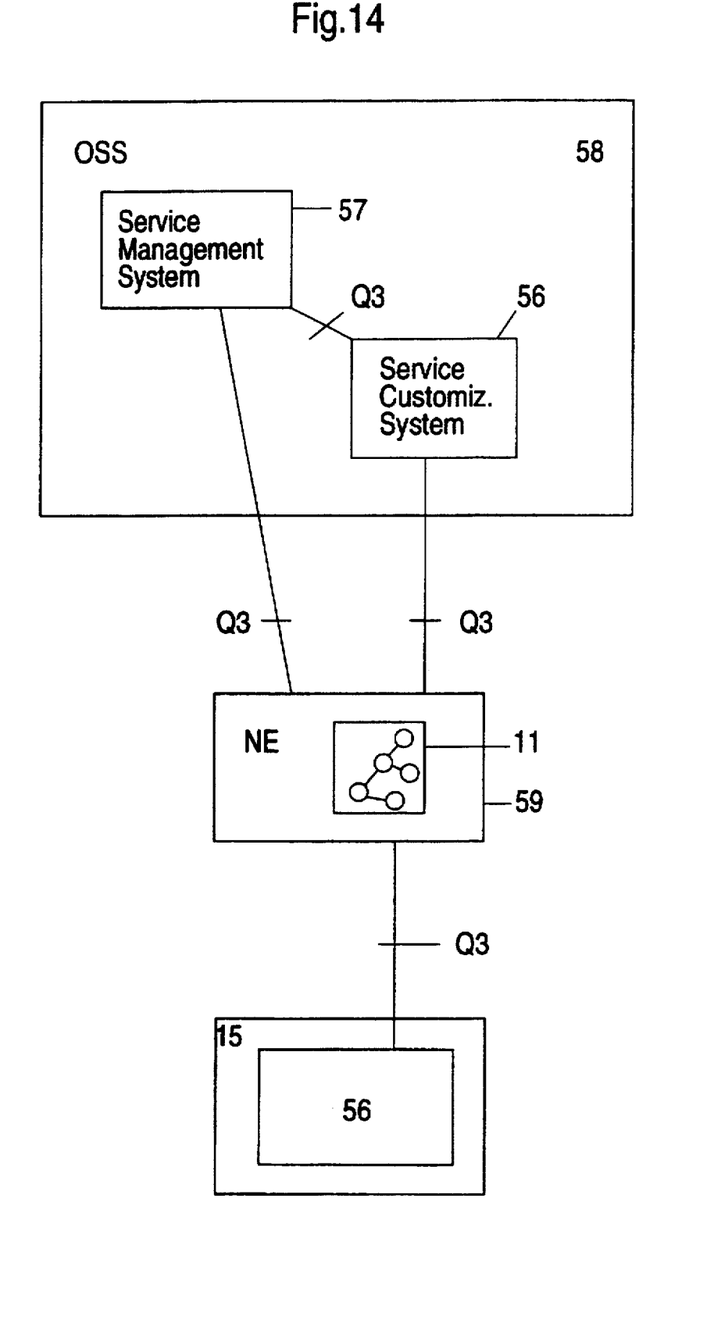
FIG. 14 is a block diagram showing an implementation of a customization interface as a managed object in a telecommunication operation and support system.

In FIG. 14 a preferred implementation of the environment in which the customized telecommunication service in accordance with the invention is used. A software tool 56 for composing customer logic, i.e. software used by the customer logic editor of FIG. 9, as well as a telecom network management system 57 form part of an operation support system (OSS) 58 which manages telecom network elements 59 such as local exchanges, access switches, wherein customer logic 11 is defined as a managed object MO in accordance with the TMN concept. In this way customer logic defined as managed objects can be operated upon as any other managed object in the network using a standard Q3 interface. Also standard security management functions can be used to control the customization process. The network operator will therefore have complete control over the customization interfaces and primitives (defined as MO:s) that are accessible by each individual service provider. A service provider 15 having the graphical editor and the software tools 56 will be able to load his customization logic into the network element 59 in the corresponding MO. Since the customer logic only contains data it can be loaded in the telecom network and new customized services can be introduced without upgrading the existing software. The customized service is provisioned to an subscriber like any other service using standard service management functions.

A "service object" for the subscriber is created and the requisite attributes are defined. One attribute that must be defined is "customization logic"-attribute. The corresponding customization logic is assigned to the "service object".

A service subscriber may fine tune the customized service to fulfill his/her own needs. For example each subscriber that uses the customized service shown in FIG. 10 can define his/her own values in the "calling number list", "date and time" and actual answering numbers C1, C2, C3. This data is called subscriber data.

The subscriber terminal may be either a PC based terminal or any other standard terminal. If the subscriber has access to a PC connected to the network, for example by using ISDN, terminal software provides the necessary user interface such as menus, graphs and communication with the network. An application protocol between the network and the terminal is needed since the terminal must fetch the data from the network, presented to the subscriber in an user friendly way, and send the modified data back to the network. This application protocol is specific to the system vendor.

If the subscriber has assess to a standard terminal, the network may provide a voice prompting menu to help the subscriber. The user communicates with the network by dialling the necessary procedures.

The information available in the MO:s is used to assure that customization logic fulfills the customization interface. I.e. the software tools 56 provides an automatic check that the customization logic complies with the interfaces involved. While being edited the customization logic is kept in the software tools 56.

We claim:

1. A method for designing a customized telecommunication service comprising a service shell and at least one service customization part, said method comprising the steps of:

designing, at a system vendor, said service shell with at least one customization point comprising a run time interface and an individual customization interface which defines the scope of the actions possible for said customization part by means of a first set of call associated parameters and a second set of primitives, said parameters and primitives being the only parameters and primitives available at said customization point;

storing said service shell in a telecommunication network, and providing said customization interface to a service provider;

designing, at the service provider, customer logic from a subset of said second set of primitives acting on a subset of said first set of parameters; and storing said customer logic in the telecommunication network where said stored service shell and said stored customer logic together constitute a complete customized service.

2. A method for designing a customized telecommunication service in accordance with claim 1, wherein the primitives are generic to different telecommunication services.

3. A method of designing a customized telecommunication service in accordance with claim 1, wherein said step of designing customer logic comprises:

stating the behavior of the customer logic with regard to the possibilities given by the service shell;
    finding the customization points in said service shell; and
    selecting, at each found customization point, the primitive that fulfills the desired behavior of the customization logic, creating an instance of the selected primitive and binding the instance of the selected primitive to the parameters of said selected primitive.

4. A method for designing a customized telecommunication service in accordance with claim 3, wherein the customization points are found by their name.

5. A method for designing a customized telecommunication service in accordance with claim 3, wherein the parameters comprise a set of input parameters and a set of result parameters as viewed from the customer logic.

6. A method for designing a customized telecommunication service in accordance with claim 5, wherein each input and result parameter comprises at least some of the following attributes: identity, data type, input/output category and relational rules.

7. A method for designing a customized telecommunication service in accordance with claim 6, wherein each customization interface further comprises address information relating to each of the parameters, the address information being protected and not available for use by the customer logic designer.

8. A method for designing a customized telecommunication service in accordance with claim 7, wherein said run time interface connects the customer logic to the service shell in run-time.

9. A method for designing a customized telecommunication service in accord with claim 8, wherein the customer logic comprises data.

10. A method for designing a customized telecommunication service in accordance with claim 9, wherein said data comprises address information relating to each primitive used by the customer logic, data to be used by said primitive, and links to other primitives.

11. A method for designing a customized telecommunication service in accordance with claim 10, wherein each primitive is associated with a respective primitive interface.

12. A method for designing a customized telecommunication service in accordance with claim 11, wherein each primitive interface comprises a set of input parameters and a set of result parameters as viewed from within the primitive.

13. A method for designing a customized telecommunication service in accordance with claim 12, wherein each input and result parameter of a primitive comprises the following attributes: identity, data type, and input/result category.

14. A method for designing a customized telecommunication service in accordance with claim 13, wherein a parameter of a primitive interface is connected with a corresponding parameter of the customization interface.

15. A method for designing a customized telecommunication service in accordance with claim 14, wherein one customization interface parameter is connected to one or more parameters in one or more primitives.

16. A method for designing a customized telecommunication service in accordance with claim 15, wherein customization interfaces are defined as managed objects in an existing operation support system.

17. A method for designing a customized telecommunication service in accordance with claim 16, wherein the set of input parameters and the set of result parameters are mapped on the managed object as attributes thereof.

18. An apparatus for providing a customized telecommunication service, comprising:

a service shell, stored in a telecommunication network, adapted to be inserted in a local exchange, and
    at least one service customization part stored on a computer readable medium, wherein said service shell comprises at least one customization point at which the customization part, in run time and after a call is made to the customization part, is added to the service shell, said customization point comprising a run time interface and an individual customization interface defining the scope of the actions possible for said customization part by means of a first set of call associated parameters and a second set of primitives, said parameters and primitives being the only parameters and primitives available at said customization point, said service customization part comprising customer logic (i) generated from a subset of said second set of primitives comprised in said customization interface and (ii) acting on a subset of said first set of parameters defined by said customization interface, the customer logic being provided in the form of data only.

19. An apparatus for providing a customized telecommunication service in accordance with claim 18, wherein the primitives are generic to different telecommunication services.

20. An apparatus for providing a customized telecommunication service in accordance with claim 18, wherein the parameters comprise a set of input parameters and a set of result parameters as viewed from the customer logic.

21. An apparatus for providing a customized telecommunication service in accordance with claim 18, wherein each input and result parameter comprises at least some of the following attributes: identity, data type, input/output category and relational rules.

22. An apparatus for providing a customized telecommunication service in accordance with claim 18, wherein each customization interface further comprises address information relating to each of the parameters, the address information being protected and not available for use by the customer logic designer.

23. An apparatus for providing a customized telecommunication service in accordance with claim 22, wherein said run time interface connects the customer logic to the service shell in run-time.

24. An apparatus for providing a customized telecommunication service in accordance with claim 22, wherein each customization point comprises a first part visible through a graphical user interface of a tool used for building the customer logic and a second part non-visible through the graphical user interface, the visible part comprising the parameters and the invisible part comprising said address information.

25. An apparatus for providing a customized telecommunication service in accordance with claim 24, wherein the customer logic generated by said tool comprises data.

26. An apparatus for providing a customized telecommunication service in accordance with claim 25, wherein said data that represent the customer logic are stored in the telecommunication network allowing for the introduction of new customized services without upgrading existing software residing in the telecommunication network.

27. An apparatus for providing a customized telecommunication service in accordance with claim 26, wherein said data comprises address information relating to each primitive used by the customer logic, data to be used by said primitive, and links to other primitives.

28. An apparatus for providing a customized telecommunication service in accordance with claim 27, wherein each primitive is associated with a respective primitive interface.

29. An apparatus for providing a customized telecommunication service in accordance with claim 28, wherein each primitive interface comprises a set of input parameters and a set of result parameters as viewed from within the primitive.

30. An apparatus for providing a customized telecommunication service in accordance with claim 29, wherein each input and result parameter of a primitive comprises the following attributes: identity, data type and input/result category.

31. An apparatus for providing a customized telecommunication service in accordance with claim 30, wherein a parameter of a primitive interface is connected with a corresponding parameter of the customization interface.

32. An apparatus for providing a customized telecommunication service in accordance with claim 31, wherein one customization interface parameter can be connected to one or more parameters in one or more primitives.

33. An apparatus for providing a customized telecommunication service in accordance with claim 32, wherein customization interfaces are defined as managed objects in an existing operation support system.

34. An apparatus for providing a customized telecommunication service in accordance with claim 33, wherein the set of input parameters and the set of result parameters are mapped on a managed object, which represents a customization interface, as attributes thereof.

* * * * *